United States Patent [19]

Nagata et al.

[11] Patent Number: 4,631,904
[45] Date of Patent: Dec. 30, 1986

[54] APPARATUS FOR COMPRESSING CIGARETTES

[75] Inventors: Tomizou Nagata; Kazutaka Kobayashi, both of Tokyo, Japan

[73] Assignee: The Japan Tobacco & Salt Public Corp., Tokyo, Japan

[21] Appl. No.: 705,312

[22] Filed: Feb. 25, 1985

[30] Foreign Application Priority Data

Mar. 9, 1984 [JP] Japan ............................... 59-043840

[51] Int. Cl.⁴ ............................................. B65B 63/02
[52] U.S. Cl. ...................................... 53/529; 53/149; 100/288
[58] Field of Search ................. 53/149, 150, 151, 236, 53/444, 529, 574, 575; 100/193, 288

[56] References Cited

U.S. PATENT DOCUMENTS

| | | | |
|---|---|---|---|
| 688,284 | 12/1901 | Bilgram et al. ................... | 53/575 X |
| 783,300 | 2/1905 | McGrath ........................ | 100/288 X |
| 3,058,275 | 10/1962 | Horgan ............................ | 53/575 X |
| 3,579,952 | 5/1971 | Davies et al. ..................... | 53/529 X |
| 3,583,130 | 6/1971 | Gianese .................................. | 53/529 |
| 3,869,035 | 3/1975 | Focke ..................................... | 53/151 |

Primary Examiner—E. R. Kazenske
Assistant Examiner—Michael D. Folkerts
Attorney, Agent, or Firm—Murray and Whisenhunt

[57] ABSTRACT

An apparatus for compressing cigarettes comprises a compression pocket having opposite open ends which comprises a pair of L-shaped compression members which are disposed in an opposite manner. Each member includes short and long segments which extend in an axial direction of a continuously rotatable drum, one of the members being movable in a tangential direction of the outer circumference of the drum, the other member being movable in a direction at an desired angle relative to said tangential direction. The apparatus also includes a device for moving the pair of L-shaped compression members in opposite directions using a rack and pinion combination system.

4 Claims, 7 Drawing Figures

F I G. 5
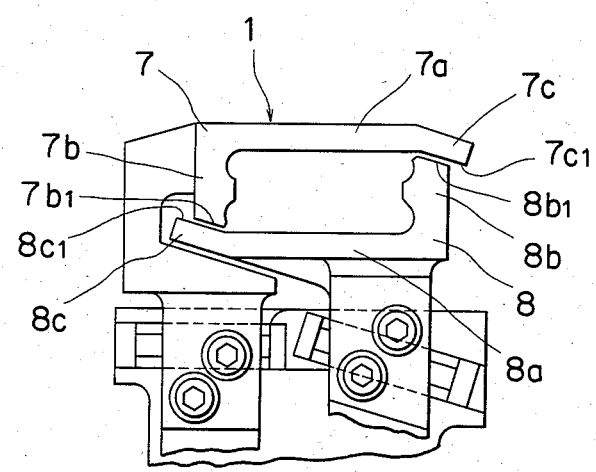

APPARATUS FOR COMPRESSING CIGARETTES

BACKGROUND OF THE INVENTION

The present invention relates to an apparatus for compressing a plurality of cigarettes which are stacked prior to packaging thereof.

After 20 cigarettes have been stacked into a cigarette bundle comprising, for example, 7, 6 and 7 cigarettes at lower, intermediate and upper stairs respectively, the cigarette bundle is inserted into from one end a rectangular arbor having opposite open ends which will be used as a core member in forming a double layered package including aluminum foil and package sheet, so that the cigarette bundle is housed in the package and is projected from the other end of the arbor. In particular, the present invention relates to an apparatus for slightly compressing the cigarette bundle at all the sides thereof prior to the insertion of the cigarette bundle for making the bundle insertion easier.

Such type of conventional apparatus comprises a pair of L-shaped compression members in which only a short segment extending in an axial direction of a continuously rotatable drum being disposed in an opposite manner so that a compression pocket having opposite open ends is formed and moving means for relatively moving the pair of the L-shaped compression members parallel to each other and at an angle relative to the radial line of the drum by means of a lever-link combination system for changing the size of the compression pocket, whereby compression of the cigarette bundles is accomplished as is disclosed in Japanese Patent Application Post-Examination Publication No. 47-23400. However, the fact that the means for moving the L-shaped compression members is arranged so that it is close to the axis of the drum and is surrounded by peripheral mechanisms causes troubles in adjustment and maintenance work of the cigarette packing machine, resulting in low efficiency of the work and necessitates a more space where the moving means is installed.

Since the short segment of the L-shaped compression member is retractably arranged, finely divided particles which have been formed from the cigarette etc. will readily invade into the slide portion, resulting in troubles in compression performance and, in turn, damage to the cigarettes.

SUMMARY OF THE INVENTION

It is an object of the present invention to provide an apparatus for compressing cigarettes which is free of the afore-mentioned drawbacks.

The present object is accomplished by an apparatus for compressing cigarettes comprising a compression pocket having opposite open ends which comprises a pair of L-shaped compression members which are disposed in an opposite manner, each member including a short and long segments which extend in an axial direction of a continuously rotatable drum, one of the members being movable in a tangential direction of the outer circumference of the drum, the other member being movable in a direction at a desired angle relative to said tangential direction and means for moving a pair of L-shaped compression members in opposite directions using a rack and pinion combination system.

BRIEF DESCRIPTION OF THE DRAWINGS

FIG. 5 is a front view showing a compression pocket which is most closed;

DETAILED DESCRIPTION OF THE PREFERRED EMBODIMENTS

The embodiment of the present invention will be described with reference to the drawings.

Figure 1:
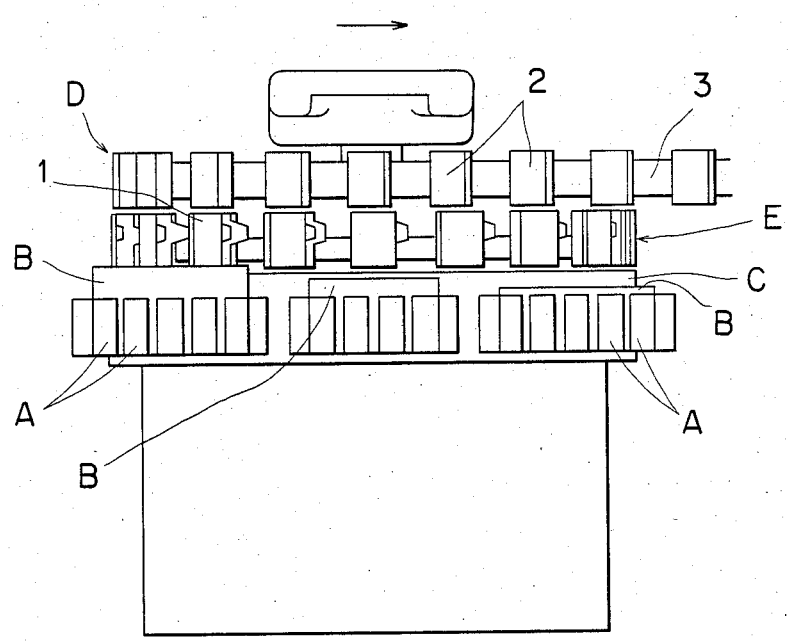
FIG. 1 is a schematic plan view showing the positional relationship of a compression drum.
Figure 2:
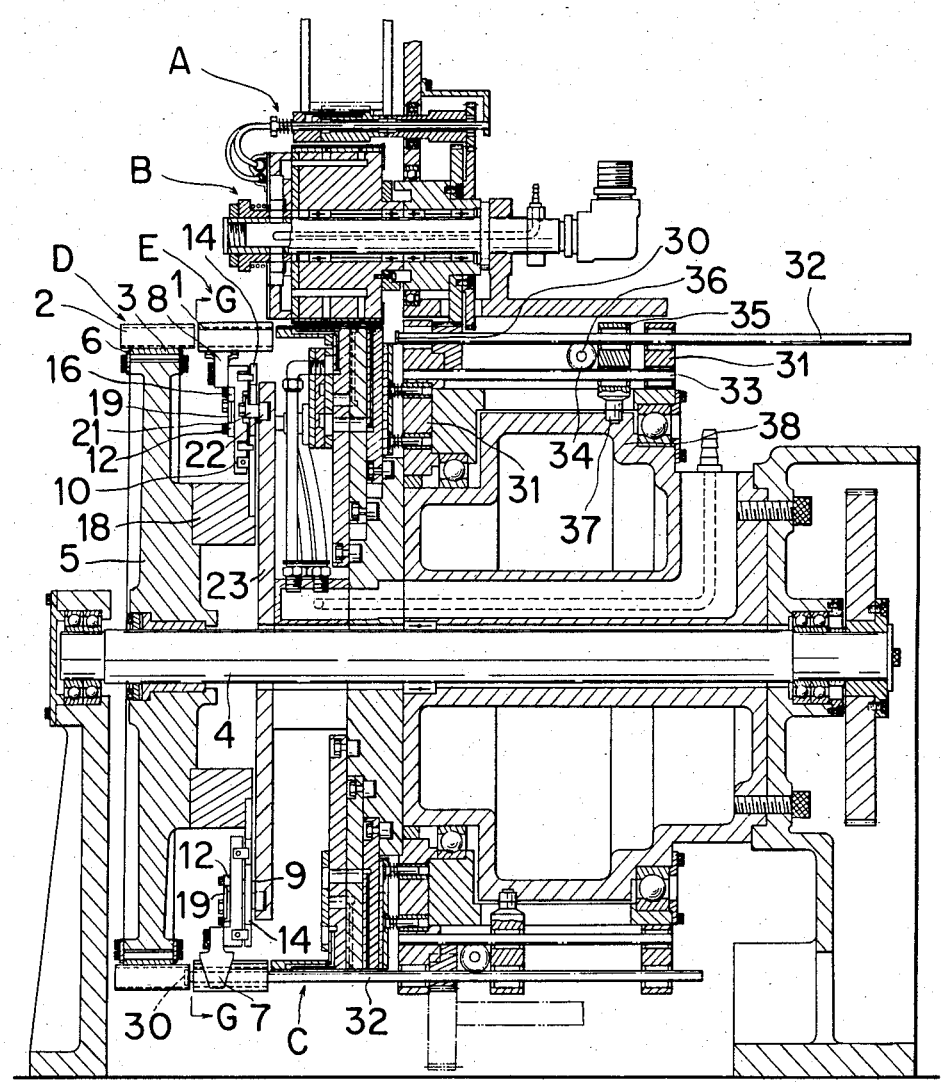
FIG. 2 is a sectional view showing the structure of the compression drum of FIG. 1.

Referring now to FIGS. 1 and 2, receiving rollers A are adapted to take up each of cigarettes. Cigarette arrangement drums B are adapted to form a cigarette line in which cigarettes which are in closed contact with each other are arranged in a line. A stacking drum C is adapted to make a group of 20 cigarette bundles a including for example 7, 6 and 7 cigarette bundles which are stacked in three layers. On the circumference of the stacking drum C there are provided equally spaced 18 stacking pockets (not shown) for receiving 20 cigarette bundles.

A conveyor D conveys the compressed cigarette bundles to a position where double layered packagings including a core which is a well known arbor are formed. The conveyor D includes an endless belt 3 on which a multiplicity of housing boxes 2 are regularly spaced is continuously rotated around a belt pulley 5 which is mounted on a rotary shaft 4. An annular plate 6 is provided for regulating the running position of the endless belt 3.

A compression drum E is positioned between the stacking drum C and the conveyor D as shown in FIG. 1 and includes 18 compression pockets 1 which are equally spaced along the circumference thereof. The compression drum E is secured to the side wall of the belt pulley 5.

The stacking pockets, compression pockets 1 and housing box 2 are arranged in such a manner that they are equally spaced in a radial direction from the axis of a rotary shaft 4 and they are disposed at equal angular positions in a rotation direction of the drum. Accordingly they are in alignment with a same axis. This enables the cigarette bundles a among drums as will be described hereafter. Description of the receiving rollers A, cigarette arrangement drum B and the stacking drum C will be omitted since they do not form the present invention.

Each compression pocket 1 comprises two L-shaped compression members 7 and 8 which are disposed in an opposite manner. One L-shaped compression member 7 comprises a long segment 7a and a short segment 7b which extend in an axial direction of the drum. The segments 7a and 7b which are integral are in the shape of L. The compression member 7 is mounted on a slide block 9 so that the long segment 7a is disposed in a tangential direction of the outer circumference of the drum. The other L-shaped compression member 8 comprises a long segment 8a and a short segment 8b which extend in an axial direction of the drum. The long and short segments 8a and 8b which are integral with each other are in the shape of L. The compression member 8 is mounted on a slide block 10 so that the long segment 8a is disposed in a parallel opposed relationship with the long segment 7a of the L-shaped compression member 7.

The slide block 9 is slidably disposed on two slide shafts 11 which are disposed in parallel relationship with the long segment 7a of the L-shaped compression member 7. The slide block 9 is provided with a rack 12 at the side end thereof. The slide block 10 is slidably disposed on two parallel slide shafts is which are at a desired angle to the block 10 corresponding to a compression ratio so that the L-shaped compression member 8 will impart a desired compression force to the L-shaped compression member in both of a lateral direction of 7 cigarettes and in an 3 layered stack direction of a cigarette bundle a within the compression pocket 1. The slide block 10 is provided with a rack 16 at the side end thereof.

An inclined inner surface $7c_1$ of a projection 7c at the tip of a long segment 7a of the L-shaped compression member 7 and an inclined end surface $8b_1$ of the short segment 8b of the L-shaped compression member 8 will not contact each otfer when they move and have such an inclination that a desired compression is obtained without damaging the cigarettes. This situation also applies to the projection 8c at the tip of the long segment 8a of the L-shaped compression member 8 and the inclined end surface $7b_1$ of the short segment 7b of the L-shaped compression member 7.

Figure 6:
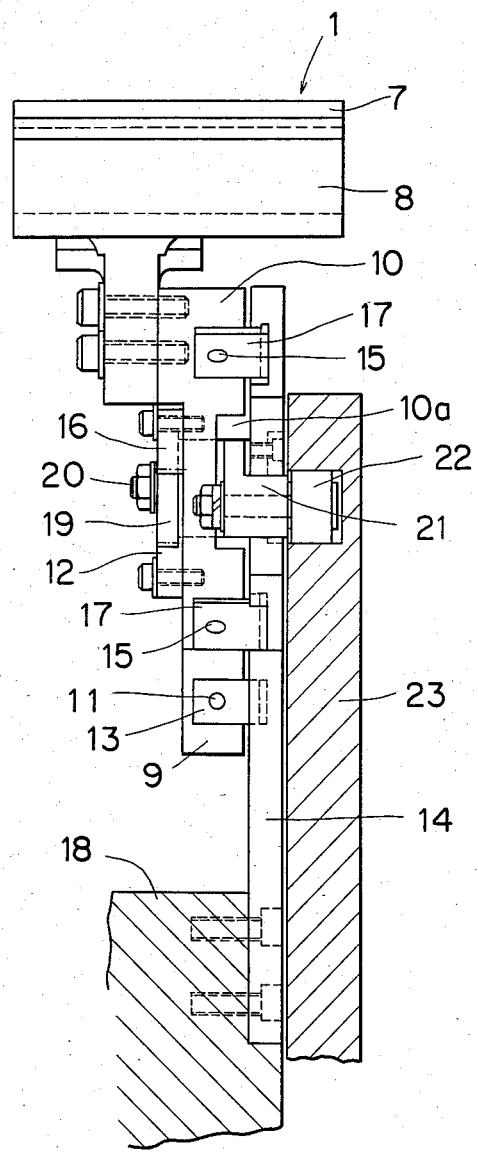
FIG. 6 is an elevational view of FIG. 4.
Figure 7:
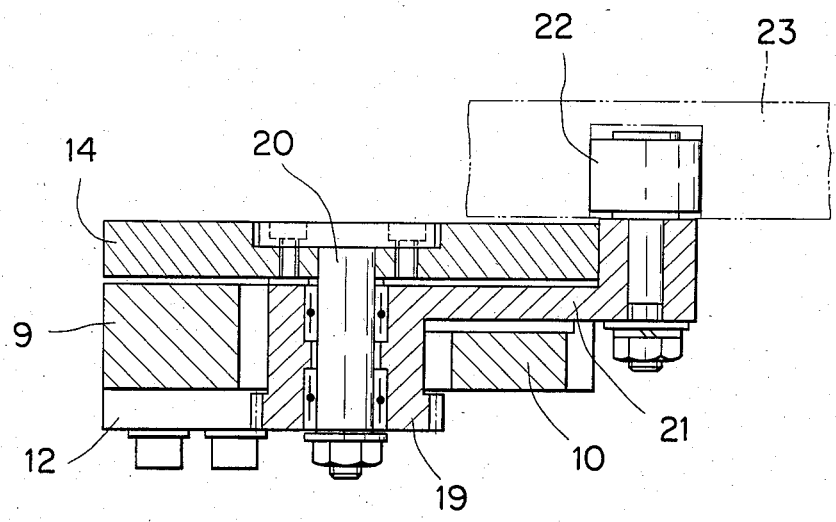
FIG. 7 is a sectional view along line K—K' of FIG. 4.

The slide shafts 11 and 15 are mounted on a retaining plate 14 via $\pi$-shaped supporting members 13 and 17 respectively. The retaining plate 14 is secured to the belt pulley 5 via the annular plate 18 as is clearly shown in FIGS. 2 and 6.

A pinion 19 through which a pin 20 extends from the retaining plate 14 are in mesh with both racks 12 and 16. The pinion 19 is provided with a lever 21 having a cam follower 22 at the tip thereof. The lever 21 extends through a cutbut 10a of the slide block 10.

The cam follower 22 is engaged with a recessed cam 23 which is provided behind the retaining plate 14. Accordingly the cam follower 22 is guided along the recessed cam 23 to rotate the pinion 19 so that both L-shaped compression members 7 and 8 are moved in opposite directions via both racks 12 and 16 for accomplishing compression of the cigarette bundle a in both lateral and stack directions.

In FIG. 2 there are provided pushing plates 30 for feeding cigarette bundles a from the stacking drum C to the conveyor. The number of pushing plates 30 is equal to those of the stacking pockets and compression pockets 1. The pushing plates 30 are disposed around a stacking drum substrate 31 so that the pushing plate 30 are aligned with the stacking and compression pockets. The pushing plates 30 are square in shape and have such a dimension that they can pass through the compression and stacking pockets. A rack 32 which supports each pushing plate 30 is axially slidably disposed on the stacking drum substrate 31 for driving the pushing plate 30. A pinion 34 is interposed between the opposing racks 32 and 33. A slide block 35 is slidably disposed along the rack 33. The slide block 35 has another axial hole through which the rack 32 slidably extends and is supported by both racks 32 and 33. The slide block 35 has a projecting shaft 36 at which the pinion 34 is rotatably journalled. A double stroke movement is transmitted to the rack 32 by the addition of the rotation of the pinion 34 to the movement of the slide block 35 when the slide block 35 is moved.

A cam follower 37 is rotatably provided at the lower end of the slide block 35. The cam follower 37 is engaged with a cylindrical cam 38 which is secured outside the stack drum substrate 31.

Figure 3:
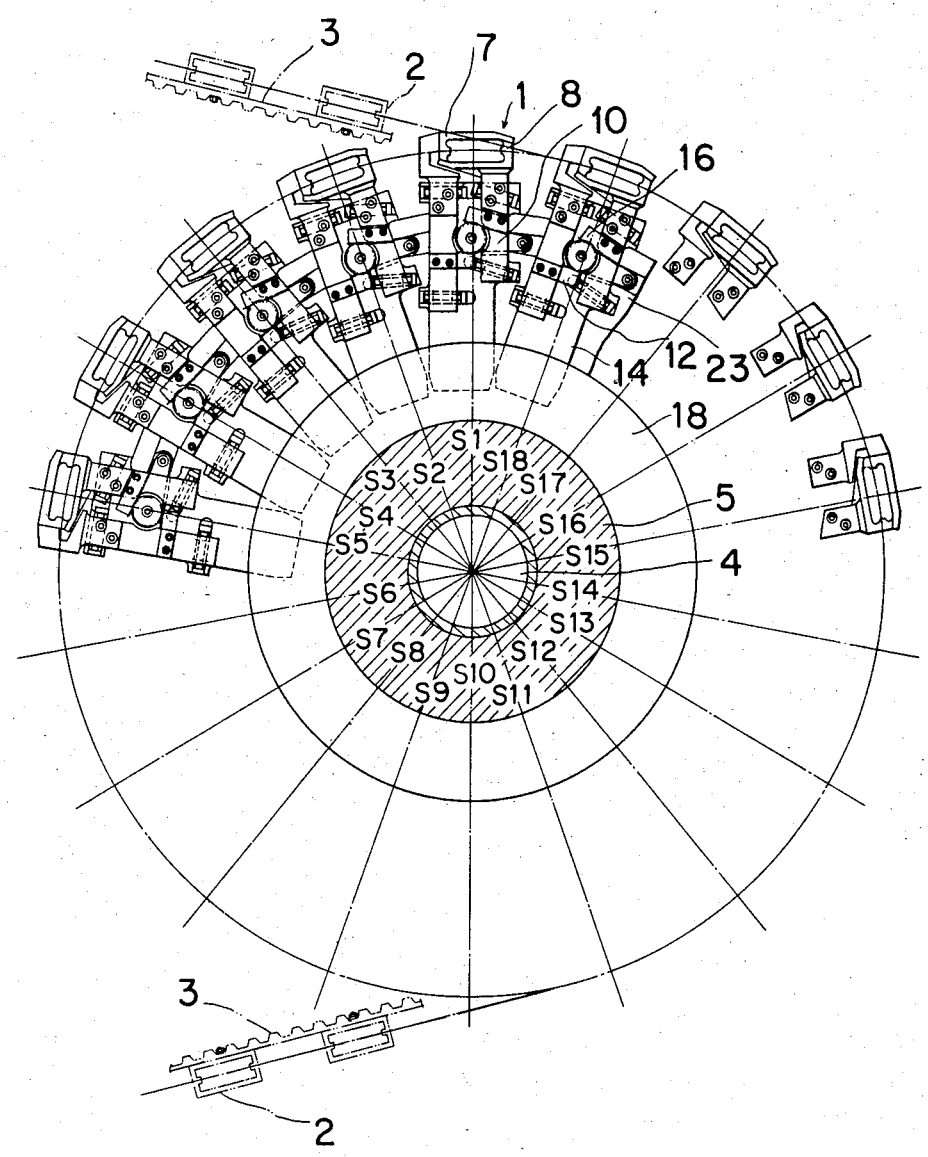
FIG. 3 is a schematic front view of the compression drum along a line G—G of FIG. 2.
Figure 4:
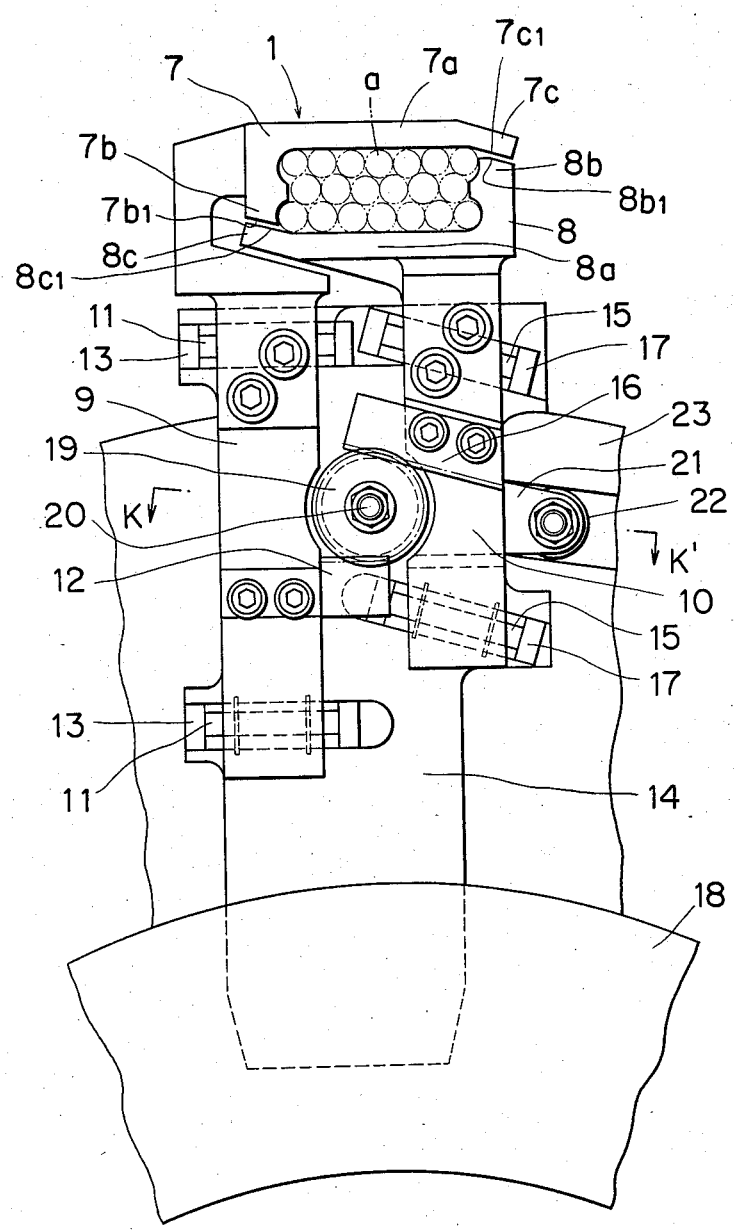
FIG. 4 is a front view showing a compression pocket which is most opened by expanding the compression apparatus of FIG. 3.

The compression process of the cigarette bundle a will be described briefly. For convenience of description, the drum circumference is equally divided into 18 segments in accordance with the embodiment as shown in FIG. 3. The segments are successively designated with S1, S2, S3 . . . S18 in an anticlockwise direction starting from the apex for representing stage positions. At stage positions from S17 to S5, the cigarettes are stacked to form a bundle a of 20 cigarettes which includes 7, 6 and 7 cigarettes at lower, intermediate and upper layers respectively. The cigarette bundle a is received in a stacking pocket of the stacking drum C.

At stage positions from S5 to S8, the cigarette bundle a is transported from the stacking pocket to the compression pocket 1 of the compression drum E by the advancement of the pushing plate 30. At this time the compression pocket 1 is in its most open condition. The pushing plate 30 is moved out of the compression pocket 1 for the subsequent compression and is disposed in a stand by position.

At the subsequent stage position S8 to S10, a suitable compression operation of the cigarette bundle a is accomplished by the opposite movements of the both L-shaped compression members 7 and 8 forming the compression pocket 1. At the stage position S9 and therearound, the compression pocket is most closed. At stage position S10, the compression pocket 1 is slightly opened to release the compression for smoothing the transportation of the cigarette bundle a to the subsequent position immediately before the stage position S10.

The compressed cigarette bundle a is fed to a housing box 2 of the conveyer D by the readvancement of pushing plate 30 from its stand by position at the stage positions S10 to S12. The cigarette bundle a is moved to subsequent steps at the stage position S12 and the following positions.

The pushing plate 30 is retracted to return to an original position from the stage positions S12 to S16.

Since the present invention adopts a combination of a rack and pinion as an apparatus for moving both L-shaped compression members forming a compression pocket in opposite directions as described above, the apparatus may be simplified and adjustment and maintanance of the machine becomes easy, resulting in easy operation. Furthermore the apparatus may be made compact in size.

What is claimed is:

1. Apparatus for compressing cigarettes, comprising:
   a stacking drum for grouping cigarettes to be compressed;
   a continuously rotatable compression drum, said drum having an outer circumference;
   a compression pocket mounted on said compression drum, said compression pocket having open ends opposite to each other, and including first and second L-shaped compression members disposed opposite to each other, said first and second L-shaped members each including a short segment and a long segment both segments extending in an axial direction of said drum, said first L-shaped member being movable in a first direction tangential to said outer circumference of said drum and said second L-shaped member being movable at an acute angle to said first direction;

rack and pinion means for moving said first and second L-shaped members in opposite directions with respect to each other to compress a cigarette bundle disposed in said pocket; and conveyor means for conveying compressed cigarette bundles from said compression pocket to a packaging station.

2. Apparatus as claimed in claim 1, in which the long segment of said first L-shaped member includes an inclined inner surface of a projection at a tip of said long segment, and the short segment of said second L-shaped member has an inclined end surface, said inclined inner surface and said inclined end surface being non-contactable with each other when said first and second L-shaped members move in said opposite directions, said inclined inner surface and inclined end surface having such an inclination that a desired compression is obtained without damaging the cigarettes.

3. An apparatus as claimed in claim 1, wherein said long segment of said first L-shaped member has a projection at a tip of said segment, and said short segment of said second L-shaped member has an inclined surface, said projection and said inclined end surface being non-contactable when said first and second L-shaped members move, said projection and said inclined end surface having such an inclination that a desired compression is obtained without damaging the cirgarettes.

4. Apparatus for compressing cigarettes, comprising:

a continuously rotatable drum having an outer circumference;

a compression pocket mounted on said drum, said pocket having open ends opposite to each other, said pocket including first and second L-shaped compression members disposed opposite to each other, said first and second L-shaped members each including a short segment and a long segment each having ends and, both segments extending in an axial direction of said drum, said first L-shaped member being movable in a first direction tangential to said outer circumference of said drum and said second L-shaped member being movable at an acute angle to said first direction;

rack and pinion means for moving said first and second L-shaped members in opposite directions with respect to each other to effect compression of a cigarette bundle contained in said compression pocket;

said end of the short segment of said first L-shaped member and said end of the long segment of said second L-shaped member defining a space therebetween, said ends being non-contactable with each other during movement of said first and second L-shaped members in opposite directions with respect to each other.

* * * * *